(12) United States Patent
Overby, Jr. et al.

(10) Patent No.: US 9,954,821 B2
(45) Date of Patent: *Apr. 24, 2018

(54) INTERNET PROTOCOL SECURITY (IPSEC) PACKET PROCESSING FOR MULTIPLE CLIENTS SHARING A SINGLE NETWORK ADDRESS

(75) Inventors: Linwood H. Overby, Jr., Raleigh, NC (US); Joyce A. Porter, Apex, NC (US); David J. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 681 days.

This patent is subject to a terminal disclaimer.

(21) Appl. No.: 13/547,603

(22) Filed: Jul. 12, 2012

(65) Prior Publication Data
US 2013/0013915 A1 Jan. 10, 2013

Related U.S. Application Data

(62) Division of application No. 11/238,613, filed on Sep. 29, 2005, now Pat. No. 8,250,229.

(51) Int. Cl.
*H04L 29/06* (2006.01)

(52) U.S. Cl.
CPC ...... *H04L 63/0236* (2013.01); *H04L 63/0263* (2013.01); *H04L 63/164* (2013.01)

(58) Field of Classification Search
CPC H04L 63/0236; H04L 63/0263; H04L 63/164
See application file for complete search history.

(56) References Cited

U.S. PATENT DOCUMENTS

| 6,049,878 | A | * | 4/2000 | Caronni et al. ................. 726/3 |
| 6,173,364 | B1 | * | 1/2001 | Zenchelsky et al. ......... 711/118 |
| 6,233,686 | B1 | * | 5/2001 | Zenchelsky ......... H04L 63/0263 726/1 |
| 6,347,376 | B1 | * | 2/2002 | Attwood et al. ................. 726/1 |
| 6,473,763 | B1 | * | 10/2002 | Corl, Jr. ............ G06F 17/30985 |
| 6,484,171 | B1 | * | 11/2002 | Corl, Jr. ................. H04L 45/00 |
| 6,636,520 | B1 | * | 10/2003 | Jason ................. H04L 63/0272 370/401 |
| 6,636,898 | B1 | * | 10/2003 | Ludovici et al. ............. 709/250 |
| 6,738,909 | B1 | * | 5/2004 | Cheng et al. ..................... 726/3 |
| 6,952,728 | B1 | * | 10/2005 | Alles et al. .................. 709/224 |

(Continued)

*Primary Examiner* — Dung B Huynh
(74) *Attorney, Agent, or Firm* — Steven M. Greenberg, Esq.; CRGO Law (57) ABSTRACT

Embodiments of the present invention address deficiencies of the art in respect to secure communications for multiple hosts in an address translation environment and provide a method, system and computer program product for IPsec SA management for multiple clients sharing a single network address. In one embodiment, a computer implemented method for IPsec SA management for multiple hosts sharing a single network address can include receiving a packet for IPsec processing for a specified client among the multiple clients sharing the single network address. A dynamic SA can be located among multiple dynamic SAs for the specified client using client identifying information exclusive of a 5-tuple produced for the dynamic SA. Finally, IPsec processing can be performed for the packet.

14 Claims, 5 Drawing Sheets

(56) References Cited

U.S. PATENT DOCUMENTS

| | | | | |
|---|---|---|---|---|
| 6,963,913 | B2* | 11/2005 | Komisky | 709/225 |
| 7,106,756 | B1* | 9/2006 | Donovan | H04L 47/15 |
| | | | | 370/395.21 |
| 7,237,107 | B2* | 6/2007 | Wray | 713/157 |
| 7,317,693 | B1* | 1/2008 | Roesch | H04L 41/12 |
| | | | | 370/252 |
| 7,386,881 | B2* | 6/2008 | Swander et al. | 726/14 |
| 7,844,731 | B1* | 11/2010 | Zhou | G06F 15/173 |
| | | | | 370/401 |
| 2002/0010792 | A1* | 1/2002 | Border et al. | 709/238 |
| 2002/0083344 | A1* | 6/2002 | Vairavan | 713/201 |
| 2002/0095603 | A1* | 7/2002 | Godwin et al. | 713/201 |
| 2002/0133608 | A1* | 9/2002 | Godwin et al. | 709/230 |
| 2002/0198981 | A1* | 12/2002 | Corl, Jr. | H04L 29/06 |
| | | | | 709/224 |
| 2003/0018591 | A1* | 1/2003 | Komisky | 706/1 |
| 2003/0128194 | A1* | 7/2003 | Pettersson | 345/173 |
| 2003/0135603 | A1* | 7/2003 | Lin | 709/223 |
| 2003/0236789 | A1* | 12/2003 | Agrawal | G06F 17/30333 |
| 2004/0117488 | A1* | 6/2004 | McNamee | 709/229 |
| 2004/0190526 | A1* | 9/2004 | Kumar | H04L 45/302 |
| | | | | 370/395.21 |
| 2005/0010765 | A1* | 1/2005 | Swander | H04L 63/20 |
| | | | | 713/166 |
| 2006/0195896 | A1* | 8/2006 | Fulp | H04L 63/0263 |
| | | | | 726/11 |
| 2007/0011448 | A1* | 1/2007 | Chhabra et al. | 713/151 |
| 2007/0028001 | A1* | 2/2007 | Phillips | G06F 8/67 |
| | | | | 709/238 |
| 2011/0197159 | A1* | 8/2011 | Chaganti et al. | 715/781 |
| 2012/0005192 | A1* | 1/2012 | Bao et al. | 707/721 |

\* cited by examiner

INTERNET PROTOCOL SECURITY (IPSEC) PACKET PROCESSING FOR MULTIPLE CLIENTS SHARING A SINGLE NETWORK ADDRESS

This application is a Divisional of U.S. application Ser. No. 11/238,613, filed on Sep. 29, 2005, entitled "INTERNET PROTOCOL SECURITY (IPSEC) PACKET PROCESSING FOR MULTIPLE CLIENTS SHARING A SINGLE NETWORK ADDRESS," the entirety of which is incorporated herein by reference.

BACKGROUND OF THE INVENTION

Field of the Invention

The present invention relates to the field of secure forms of computer communications and more particularly to secure forms of computer communications for multiple clients sharing a single network address.

Description of the Related Art

Internet security has increasingly become the focus of information technologists who participate in globally accessible computer networks. In particular, with the availability and affordability of broadband Internet access, even within the small enterprise, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet hackers, crackers and script kiddies, collectively referred to as "malicious hackers".

Notably, many such unauthorized intruders continuously scan the Internet for Internet Protocol (IP) addresses and ports of vulnerable computers communicatively linked to the Internet. At the minimum, those vulnerable computers can experience nuisance damage such as accessed, deleted or modified files or defaced Web pages. Yet, at the other extreme, for the unsuspecting end-user their computer can become the staging area for "zombies" with which more malicious attacks can be launched resulting in the crippling of whole segments of the Internet.

To address the vulnerability of computing devices exposed to the global Internet, information technologists have deployed network address translation (NAT) and network port address translation (NAPT) technologies deployed as a firewall. NAT technologies map a publicly known network address to a privately known address within a private network. In this way, external intruders cannot directly access private network devices as the private network address can be shielded from the external intruder through the proxy action of NAT. The use of NAT, however, requires a one-to-one correspondence between private and public address. To economize on the cost of a single public network address (which can be expensive), a NAPT configured firewall can act similarly to NAT excepting that a single public address can map to multiple private devices which can be distinguished by unique port assignments behind the firewall.

While NAPT and NAT enable security for devices behind the firewall, NAPT and NAT can do little to secure data in transit between source and destination nodes in the Internet. To provide true, end-to-end security for data in the Internet, secure communications must be employed. The Internet Security Protocol, known in the art as "IPsec" represents a common form of secure communications for use over the Internet. In IPsec, communications between source and destination nodes in the Internet can be administered in accordance with a security association (SA). An SA can include one or more rules that define the IPsec processing that is applied to the communication. IPsec is defined in the Request for Comment (RFC) 2401 among other RFCs.

In IPsec, whether the transmission of a packet is denied or permitted with or without IPsec processing is determined by matching the attributes of a packet within the security rules in a security policy database (SPD). To make this determination, both the static rules of a security policy and dynamic rules negotiated as part of an Internet Key Exchange (IKE), each which refers to an SA as described in RFC 2401, can be subjected to a filtered search in the order of most specific to least specific attributes for both outgoing and incoming packets. The filtering of the attributes of a packet within the security rules can be based upon the source and destination address for the paired nodes engaging in secured communications.

For a more complete explanation of the filtering process, U.S. Pat. No. 6,754,832 to Godwin et al. for SECURITY RULE DATABASE SEARCHING IN A NETWORK ENVIRONMENT (Godwin) describes in detail the process of locating a security rule during IPsec processing. Specifically, as described in Godwin, IPsec rules are filtered according to attributes assigned to the rules. The attributes include the source Internet Protocol (IP) address, destination IP address, source port, destination port and protocol. Each dynamic rule contained in the dynamic rules specifies values for all five attributes, hereinafter referred to as the 5-tuple. The static rules include placeholders for sets of dynamic rules. Dynamic rules generally can be searched only if a placeholder is the first matching rule in the static table.

The base standard for applying IPsec with NAT traversal is described in RFC 3947 and RFC 3948. In these documents, a general incompatibility is discussed as between IPsec and NAT traversal. Yet, a more specific inability of IPsec and NAT traversal to support the processing of multiple SAs from multiple clients with the same 5-tuple follows. In particular, inasmuch as IPsec filters the attributes of a packet within security rules in an SPD based upon the source and destination address for paired nodes, the sharing of a single network address for a node can produce ambiguities in the filtering process as SAs for different clients behind an NAPT platform can produce the same 5-tuple.

BRIEF SUMMARY OF THE INVENTION

Embodiments of the present invention address deficiencies of the art in respect to secure communications for multiple clients in an address translation environment and provide a novel and non-obvious method, system and computer program product for IPsec packet processing for multiple clients sharing a single network address. In one embodiment, a computer implemented method for IPsec packet processing for multiple clients sharing a single network address can include receiving a packet for IPsec processing in association with a specified client among the multiple clients sharing the single network address. A dynamic filter rule can be located among multiple dynamic filter rules for the specified client using client identifying information exclusive of a 5-tuple produced for the dynamic filter rule, for instance using a user datagram protocol (UDP) encapsulating source port for the specified client. Finally, IPsec processing can be performed for the packet using the located dynamic filter rule.

Receiving a packet for IPsec processing in association with a specified client among the multiple clients sharing the single network address can include receiving an inbound packet for IPsec inbound processing for a specified client among the multiple clients sharing the single network address, extracting the UDP encapsulating source port from the packet, and storing the UDP encapsulating source port from the packet in association with a filter for the dynamic filter rule. As such, the method also can include receiving an outbound packet for IPsec outbound processing for the specified client, determining a 5-tuple for the outbound packet, locating a plurality of dynamic SAs for the 5-tuple, and selecting one of the dynamic SAs based on the selection of a NAT resolution filter (NRF) which has a 5-tuple that exactly matches the 5-tuple of the packet and which is associated with the dynamic SA.

In another embodiment, a data processing system for IPsec packet processing for multiple clients sharing a single network address can include a security policy database (SPD) and IPsec processing logic coupled to the SPD wherein the IPsec processing logic includes program code enabled to permit multiple dynamic filter rules for the different clients. Optionally, the IPsec processing logic further can be coupled to a host computing device. Alternatively, a gateway can be provided for multiple, different host computing devices, wherein the IPsec processing logic can be further coupled to the gateway for the different host computing devices.

Notably, the system further can include SA resolution logic coupled to the IPsec processing logic. The SA resolution logic can include program code enabled to receive packets for IPsec processing for specified clients among the multiple different clients sharing the single network address, locate a single dynamic SA among a plurality of dynamic SAs for each of the specified clients using client identifying information exclusive of a 5-tuple produced for the dynamic SAs, and perform IPsec processing of the received packets. In this regard, the client identifying information can include a UDP encapsulating source port for each of the specified clients.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for IPsec packet processing for multiple clients sharing a single network address in an address translation environment. In accordance with an embodiment of the present invention, a dynamic filter rule can be located among multiple dynamic filter rules for different clients sharing a single network address in an address translation environment by referring to a client identifier produced by the IPsec process. In particular, the UDP encapsulating source port produced during IPsec processing for inbound and outbound packets can be used to differentiate between multiple dynamic filter rules for corresponding different clients sharing a single public network address. As a result, IPsec can coexist with NAPT without falling victim to the ambiguities of multiple clients sharing a single public network address in an address translation environment.

Figure 1:
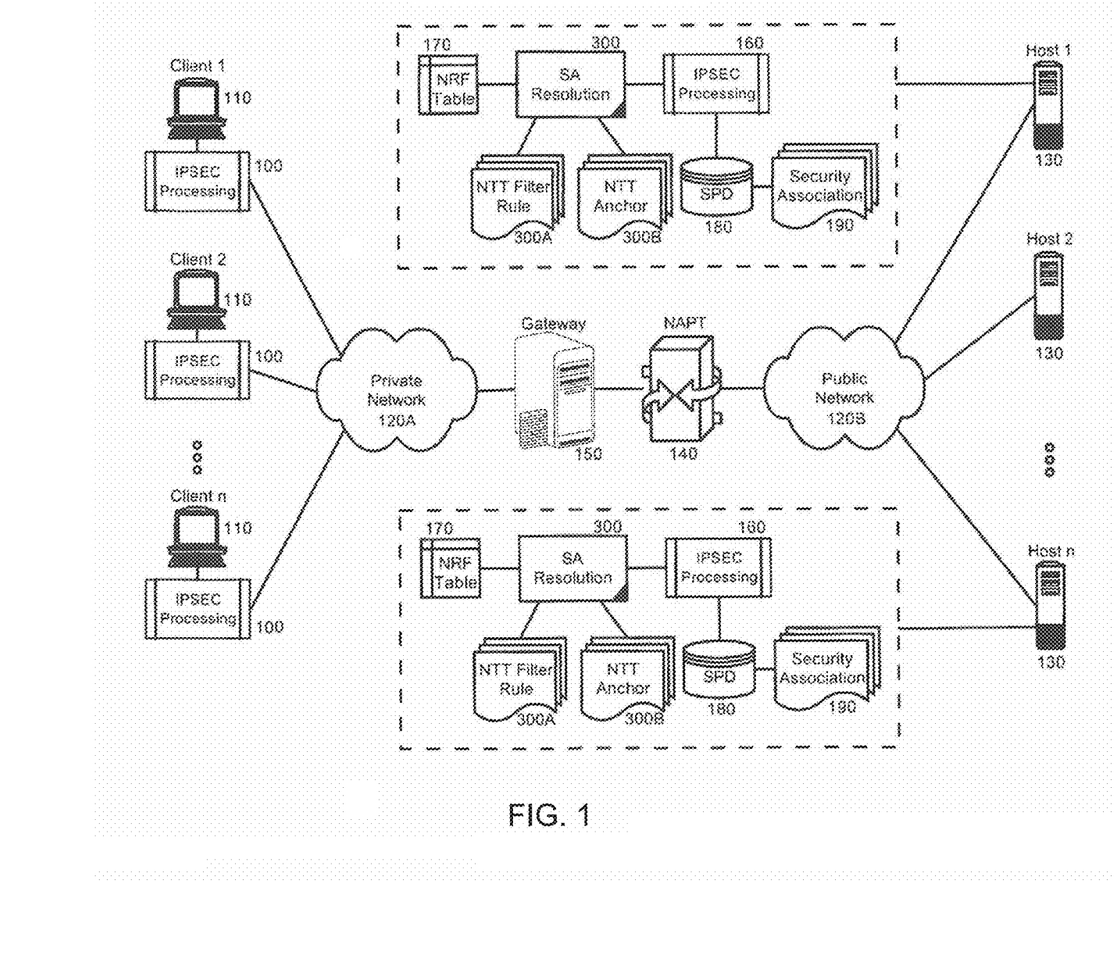
FIG. 1 is a schematic illustration of an address translation environment configured for IPsec packet processing for multiple clients sharing a single network address.

In further illustration, FIG. 1 is a schematic illustration of an address translation environment configured for IPsec packet processing for multiple clients sharing a single network address. The address translation environment can include two or more hosts 130 communicatively coupled to one or more client computing devices 110 utilizing NAPT behind NAPT device 140 and router/gateway 150 in a private computer communications network 120A. The hosts 130 and the client computing devices 110 can be configured to securely communicate with one another over a public computer communications network 120B, for example the global Internet.

Secure communications can be enabled through the operation of client side IPsec processing logic 100 cooperatively engaged with server side IPsec processing logic 160. In IPsec transport mode, the IPsec processing logic 100 can be associated with the client computing devices 110. By comparison, in IPsec tunnel mode, the IPsec processing logic 100 can be associated with the router/gateway 150 for the client computing devices 110.

The server side IPsec processing logic 160 can be disposed within or in association with one or more of the hosts 130 as shown in FIG. 1, or with a gateway platform (not shown) for one or more of the hosts 130. To facilitate the application of security rules in IPsec processing incoming and outgoing packets, an SPD 180 can be coupled to the IPsec processing logic 160. The SPD 180 can reference one or more SAs 190 defining security rules to be applied during IPsec processing. Notably, SA resolution logic 300 further can be coupled to the IPsec processing logic 160. The SA resolution logic 300 can include program code enabled to select a particular SA from among the SAs 190 for a particular one of the client computing devices 110 behind the NAPT platform 140.

To enable the selection of a particular SA from the among the SAs 190 for a particular one of the client computing devices 110 behind the NAPT platform 140, the SA resolution logic 300 can be coupled to one or more dynamic filter rules installed in a stack for a negotiated SA, referred to herein as NAT traversal (NTT) filter rules 300A. In this regard, there is a one-to-one mapping between NTT filter rules 300A and matching dynamic SAs 190. The SA resolution logic 300 further can be coupled to one or more placeholder dynamic filter rules referred to herein as NTT anchors 300B. Each NTT anchor 300B can match a 5-tuple and can be associated with one or more NTT filter rules 300A matching the 5-tuple. Finally, the SA resolution logic 300 yet further can be coupled to a NAT resolution filter (NRF) table 170. Importantly, the NRF table 170 can store differentiating information for resolving different ones of the NTT filter rules 300A which match a provided 5-tuple.

In operation, restrictions on IPSec SAs for the multiple client computing devices 110 behind the NAPT platform 140 which share a single public address can be lifted and the IPsec processing logic 160 can be permitted to engage in IKE for IKE peers among the client computing devices 110 having different IKE UDP source ports. The SA resolution logic 300 can be enabled to store differentiating information for each of the client computing devices 110 associated with a negotiated SA during IKE in an NTT filter rule 300A along with a conventional 5-tuple for the packet which can include the source IP address, destination IP address, source port, destination port and protocol. The differentiating information can include, for example, the UDP encapsulating port for each packet, and the differentiating information can be stored in the NRF table 170 so that using the differentiating information, an NTT filter rule 300A can be resolved for a particular one of the client computing devices 110 behind the NAPT platform 140 even though the 5-tuple can resolve to multiple, different SAs for different ones of the client computing devices 110.

Figure 2:
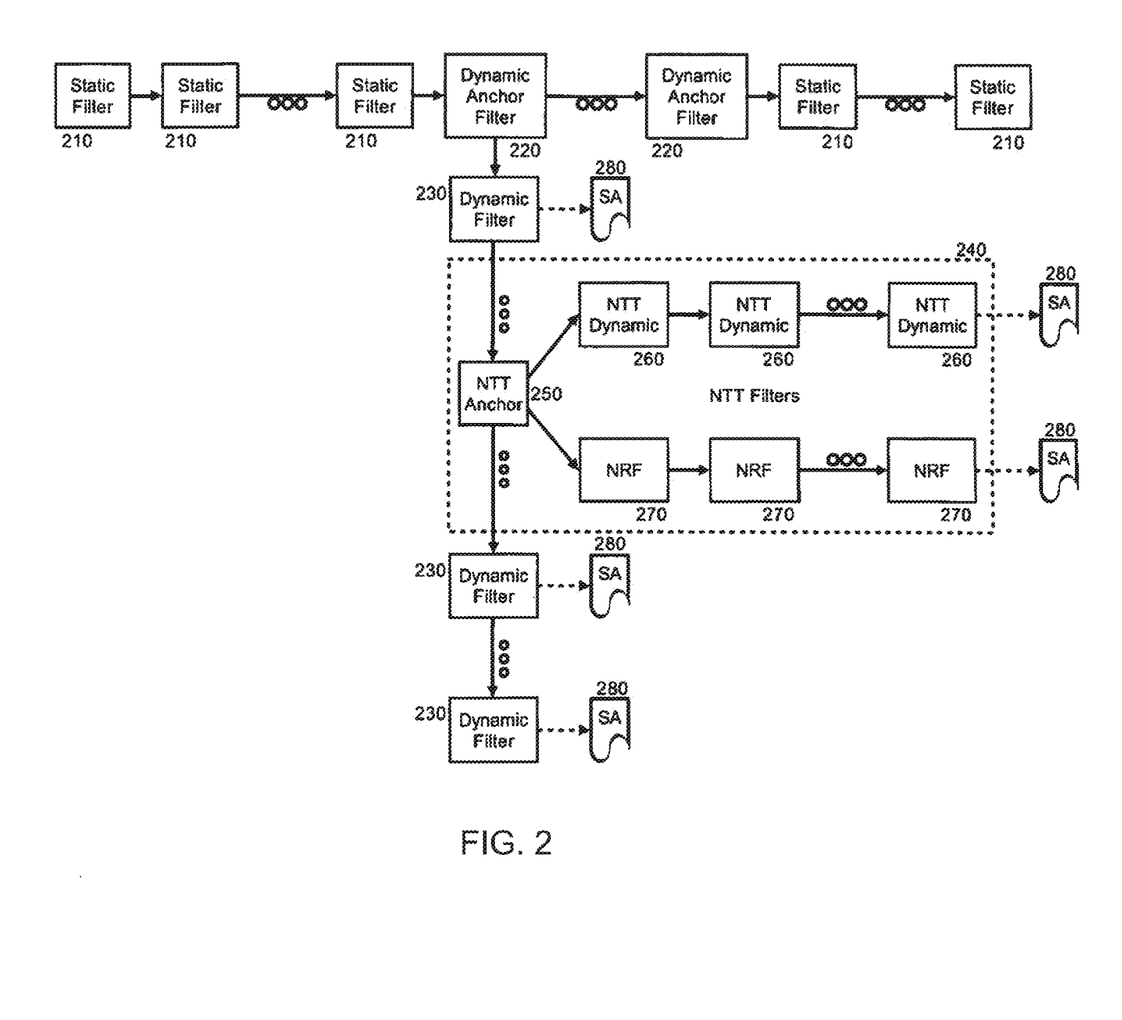
FIG. 2 is a block diagram of a security policy database architecture configured for IPsec packet processing for multiple clients sharing a single network address in the address translation environment of FIG. 1; and, FIGS. 3A through 3C, taken together, are a flow chart illustrating a process for IPsec packet processing for multiple clients sharing a single network address in the address translation environment of FIG. 1.

To support the resolution of multiple NTT filter rules 300A which match a given 5-tuple, the SPD 180 can be arranged to have an architecture which accommodates the entries of the NRF table 170, the NTT filter rules 300A and the NTT anchors 300B. In more specific illustration, FIG. 2 is a block diagram of an SPD architecture configured for IPsec packet processing for multiple clients sharing a single network address in the address translation environment of FIG. 1. As shown in FIG. 2, the SPD architecture can include one or more static filter rules 210 arranged in a data structure. One or more dynamic anchor filters 220 can be disposed among the static filter rules 210 as placeholders for one or more dynamic filters 230.

Each dynamic anchor filter 220 can point to a data structure of one or more dynamic filters 230 which reference corresponding SAs 280. Notably, the dynamic filters 230 can include an NTT composite structure 240. The NTT composite structure 240 can include an NTT anchor 250 which can point to a data structure of one or more NTT filter rules 260 and also one or more NRF entries 270 in an NRF table, each of the NTT filter rules 260 and NRF entries 270 also resolving to corresponding SAs 280. Using the foregoing arrangement, a specific NRF entry 270 including differentiating information can be located for a 5-tuple which resolves to multiple SAs. Using the differentiating information, a specific one of the SAs 280 for a 5-tuple can be identified.

More specifically, during inbound filter processing, the UDP source port from an encapsulating UDP packet is known. Therefore, the UDP source port can be used to determine a correct one of the inbound NTT filter rules 260. The search order through the filter table can include first locating a matching dynamic anchor filter rule 220 based on the 5-tuple for the packet. Secondly, a matching NTT anchor 250 can be located based upon the 5-tuple. Thirdly, an NTT filter rule 260 can be located using the 5-tuple and the UDP source port. Finally, the UDP source port can be stored in an NRF entry 270 for the 5-tuple for use during outbound filtering where the UDP source port is not known a priori. Notably, for each unique 5-tuple received in a packet during inbound processing a new NRF can be built. Since an SA can be used by packets with different 5-tuples, and since there is a one-to-one relationship between an NTT filter rule and a dynamic SA, more than one NRF can be associated with each NTT filter rule.

Figure 3A:
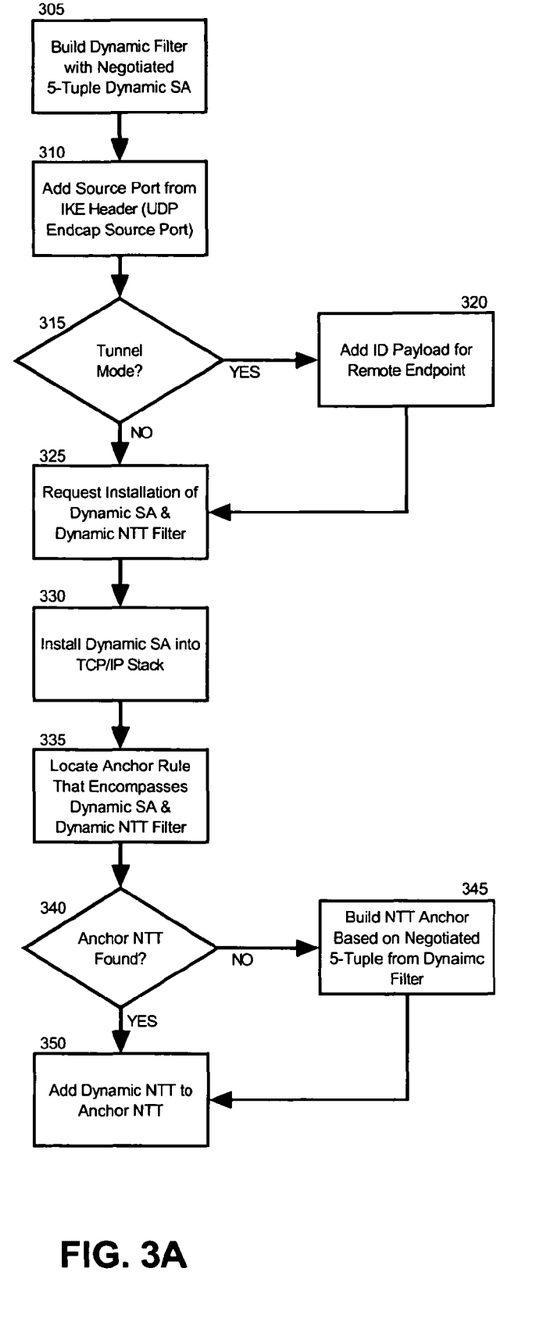
Figure 3B:
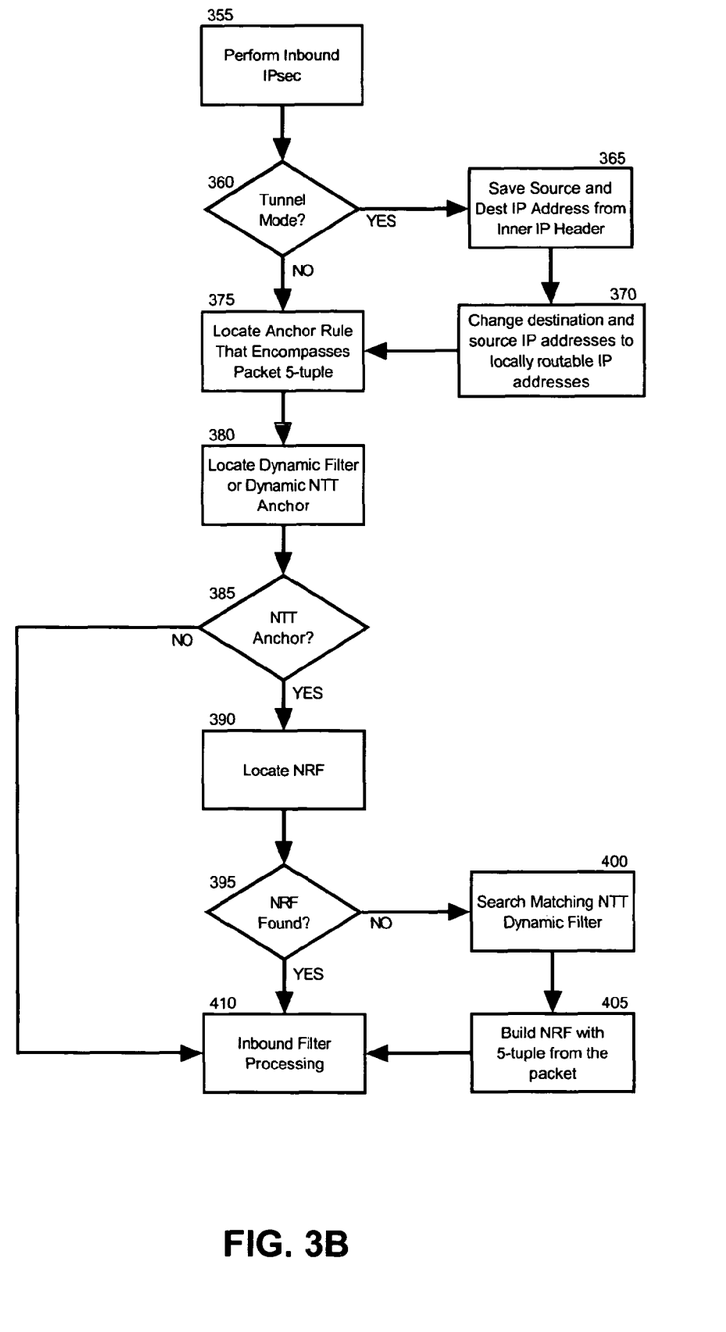
Figure 3C:
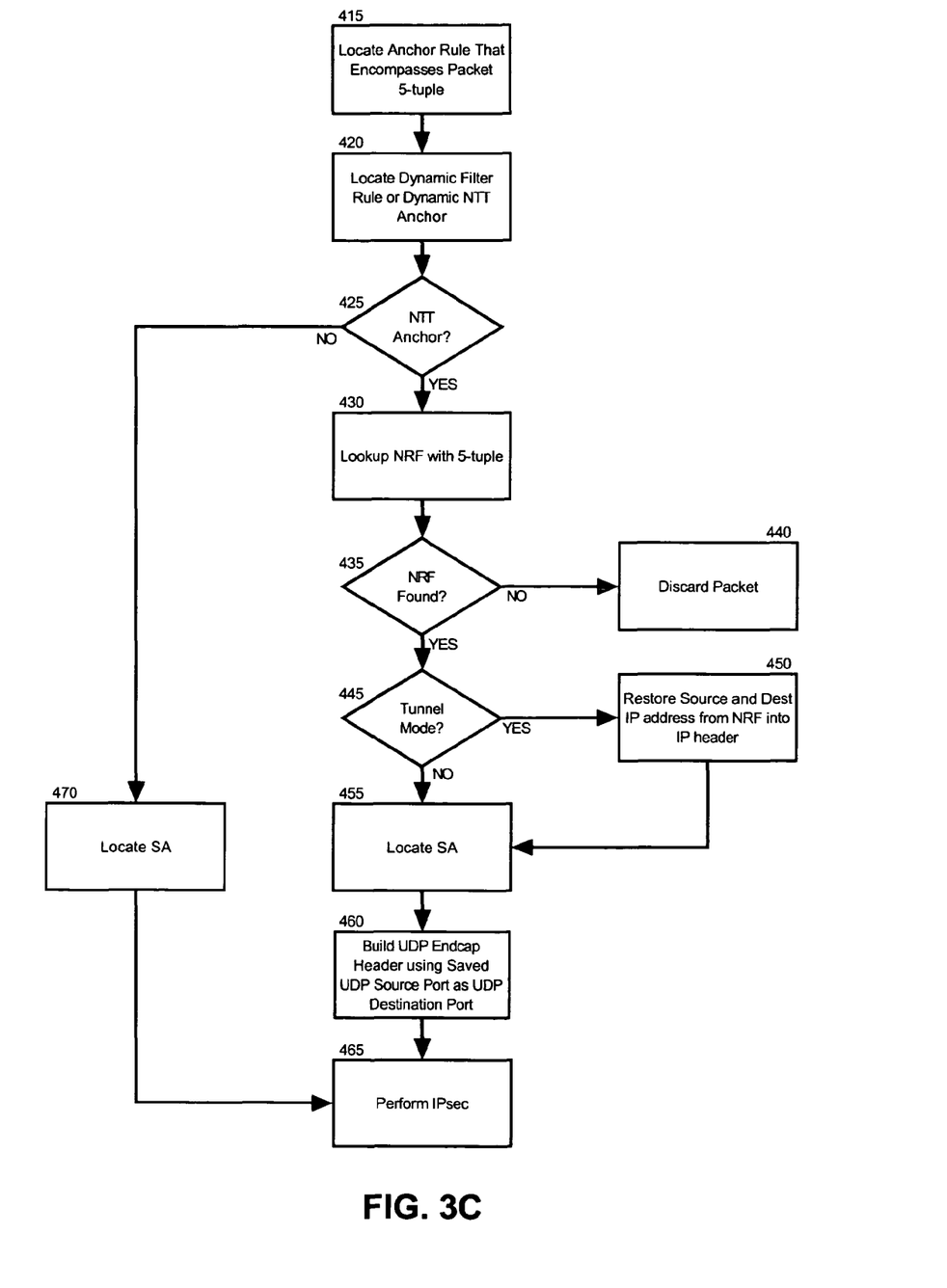

In more particular illustration, FIGS. 3A through 3C, taken together, are a flow chart illustrating a process for IPsec packet processing for multiple clients sharing a single network address in the address translation environment of FIG. 1. Referring initially to FIG. 3A, an IPsec process is shown for populating the stack with dynamic anchor filter rules and NRF entries according to the SPD architecture of FIG. 2. Beginning in block 305, a dynamic NIT filter can be built with a 5-tuple from the dynamic SA negotiated during IKE. In block 310, the UDP encapsulating source port can be identified from the IKE header and added to the dynamic NTT filter. In decision block 315, if tunnel mode has been established for the IPsec process, in block 320, the identifying payload for the remote endpoint can be added to the dynamic SA. Subsequently, in block 325, a request can be generated for the TCP/IP stack to install the dynamic SA and a dynamic NTT filter for the dynamic SA in the stack, and in block 330, the dynamic SA can be installed in the stack.

Subsequent to SA negotiation by IKE, during the TCP/IP stack dynamic SA and dynamic NTT filter installation processing, in block 335, an anchor rule can be located that encompasses the dynamic SA and the dynamic NTT filter. In decision block 340, if an NTT anchor rule can be located for the dynamic SA, in block 350 the dynamic NTT can be added to the located NTT anchor rule. Otherwise, in decision block 340, if an NTT anchor rule cannot be located for the dynamic SA and dynamic NTT filter, in block 345 an NTT anchor rule can be built based upon the negotiated 5-tuple from the dynamic filter. Finally, in block 350, the dynamic NIT can be added to the NTT anchor rule.

Turning now to FIG. 3B, a flow chart is shown illustrating inbound packet processing utilizing the dynamic anchor filter rules and dynamic NTT filter entries in the stack. Beginning in block 355, inbound IPsec can be performed. In decision block 360, if tunnel mode has been established, in block 365 the source and destination IP addresses from the inner IP header of the packet can be saved. Also, in block 370 the destination IP address in the inbound packet can be changed to a locally routable IP address if host 130 is behind a NAT. For instance, the locally routable IP address can be obtained from the destination IP address in the outer header if the data traffic endpoint is the SA endpoint. Also, in block 370 the source IP address in the packet can be changed to a locally routable IP address if client 100 is behind a NAPT. For instance, the locally routable source IP address can be obtained from the outer header.

In block 375, an NTT anchor rule can be located in the stack that encompasses the 5-tuple from the packet. Also, in block 380, a dynamic filter or dynamic NIT anchor can be located that encompasses the 5-tuple from the packet. In decision block 385, if an NTT anchor can be located, the IPsec peer is located behind a NAPT platform and in block 390, an NRF entry can be located in the NRF table. In decision block 395, if an NRF entry cannot be located, in block 400 a matching NTT dynamic filter can be located using the 5-tuple and the UDP encapsulated source port. In block 405, an NRF entry can be constructed using the 5-tuple and the UDP encapsulating source port of the packet. The NRF is also constructed to reference the SA that is referenced by the matching NTT dynamic filter and also the saved source and destination addresses from the inner IP header. Finally, in block 410, inbound filter processing can commence.

Finally, FIG. 3C is a flow chart which illustrates outbound packet processing utilizing the dynamic anchor filter rules and NRF entries in the stack. Beginning in block 415, an anchor rule can be located that encompasses the 5-tuple of the outbound packet. In block 420, a dynamic filter rule or a dynamic NTT anchor can be located for the anchor rule. In decision block 425, if a dynamic NTT anchor is not located, in block 470, the dynamic SA for the dynamic filter can be retrieved and IPsec can be performed on the packet in block 465. Otherwise, the process can continue through block 430.

In block 430, an NRF entry can be located for the dynamic NTT anchor using the 5-tuple. In decision block 435, if an NRF entry cannot be located, in block 440 the packet can be discarded. Otherwise, in decision block 445, if tunnel mode has been established, in block 450 the IP source and destination addresses from the NRF entry can be restored into the IP header. In block 455, an SA can be located for a host associated with the located NRF entry. Subsequently, a UDP encapsulating header can be constructed in block 460 using the UDP encapsulating source port from the NRF entry as the destination port. Finally, in block 465, IPsec processing can be performed on the packet.

Thus, it will be apparent that on inbound processing, an SA can be selected among multiple SAs for different clients sharing a single network address in an address translation environment by referring to the UDP encapsulating source port produced by the IPsec process. Also, on outbound processing, an SA can be selected among multiple SAs for different clients sharing a single network address in an address translation environment by referring to an NRF entry located in association with a 5-tuple for an outbound packet. As a result, IPsec can coexist with NAPT despite the ambiguities of identical 5-tuples produced for multiple clients sharing a single public network address in an address translation environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The storage medium can be an electronic, magnetic, optical, electromagnetic, infrared, or semiconductor system (or apparatus or device). Examples of a computer-readable (usable) storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. With specific reference to a computer usable (readable) storage medium, it is to be understood that a computer usable (readable) storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer implemented method for Internet protocol security (IPsec) packet processing for multiple clients sharing a single network address comprising:
   receiving a packet for IPsec processing in association with a specified client among the multiple clients sharing the single network address;
   extracting from the packet, a user datagram protocol (UDP) encapsulating source port for the specified client;
   locating a specific dynamic filter rule for the specified client by
      locating multiple dynamic filter rules matching a 5-tuple for the packet, the 5-tuple consisting of a source Internet Protocol (IP) address, a destination IP address, a source port, a destination port, and a protocol; and
      subsequent to the locating of the multiple dynamic filter rules, determining the specific dynamic filter rule from the multiple dynamic filter rules using client identifying information from only the UDP encapsulating source port and not including the 5-tuple produced for the packet; and,
   performing IPsec processing of the packet using the located specific dynamic filter rule.

2. The method of claim 1, further comprising:
   receiving an outbound packet for IPsec outbound processing for the specified client;
   determining a 5-tuple for the outbound packet;
   locating a plurality of dynamic security associations (SAs) for the 5-tuple; and,
   selecting one of the located dynamic SAs based on a selection of a network address translation (NAT) resolution filter (NRF) that has a 5-tuple matching the 5-tuple for the outbound packet and that is associated with the selected one of the located dynamic SAs.

3. The method of claim 1, further comprising
   constructing a security policy database comprising a plurality of static filters and dynamic anchor filters;
   pointing each of the dynamic anchor filters to at least one of a dynamic filter and a NAT traversal (NTT) anchor; and,
   pointing each of the NTT anchors to one of an NTT dynamic filter and an NAT resolution filter (NRF) entry.

4. The method of claim 1, further comprising:
   building a NAT resolution filter (NRF) entry for an inbound packet; and, using the NRF entry when processing an outbound packet to select a security association (SA) among multiple SAs for IPsec processing the outbound packet.

5. A data processing system for Internet protocol security (IPsec) packet processing for multiple clients sharing a single network address, comprising:
   a security policy database (SPD);
   a processor configured to include
   IPsec processing logic having program code enabled to
      receive a packet for IPsec processing in association with a specified client among the multiple clients sharing the single network address;
      extract from the packet, a user datagram protocol (UDP) encapsulating source port for the specified client; and
      perform IPsec processing of the packet using a located specific dynamic filter rule; and
   dynamic filter rule resolution logic coupled to the SPD and the
   IPsec processing logic, the dynamic filter rule resolution logic having program code enabled to
      locate multiple dynamic filter rules matching a 5-tuple for the packet, the 5-tuple consisting of a source Internet Protocol (IP) address, a destination IP address, a source port, a destination port, and a protocol; and
      subsequent to the locating of the multiple dynamic filter rules, determine the specific dynamic filter rule from the multiple dynamic filter rules using client identifying information from only the UDP encapsulating source port and not including the 5-tuple produced for the packet.

6. The data processing system of claim 4, further comprising SA resolution logic coupled to the IPsec processing logic, the SA resolution logic comprising program code enabled to receive packets for IPsec processing for specified clients among the different clients sharing the single network address, locate a single dynamic security association (SA) among a plurality of dynamic SAs for each of the specified clients using client identifying information exclusive of a 5-tuple produced for the dynamic SAs, and perform IPsec processing of the received packets.

7. The data processing system of claim 6, further comprising:
   a network address translation (NAT) resolution filter (NRF) table comprising a plurality of entries, each entry associating a UDP encapsulated source port with a corresponding dynamic SA; and,
   a stack of static filters, dynamic anchor filters, dynamic filters, NAT traversal (NTT) anchors, and NTT dynamic filters pointing to entries in the NRF table.

8. The data processing system of claim 7, wherein the dynamic anchor filters are disposed among the static filters and wherein each of the dynamic anchor filters points to one of the dynamic filters and the NTT anchors, and wherein each of the NTT anchors points to one of the NTT dynamic filters and the entries in the NRF table.

9. The data processing system of claim 7, wherein the IPsec processing logic is further coupled to a host computing device.

10. The data processing system of claim 7, further comprising a gateway for different hosts computing devices, wherein the IPsec processing logic is further coupled to the gateway for the different host computing devices.

11. A computer program product comprising a computer usable storage medium that is not a transitory signal per se, the computer usable storage medium having stored therein computer usable program code for Internet protocol security (IPsec) packet processing for multiple clients sharing a single network address, said computer usable program code, which when executed by a data processing hardware system, causing the data processing hardware system to perform the operations of:
   receiving a packet for IPsec processing in association with a specified client among the multiple clients sharing the single network address;
   extracting from the packet, a user datagram protocol (UDP) encapsulating source port for the specified client;
   locating a specific dynamic filter rule for the specified client by
      locating multiple dynamic filter rules matching a 5-tuple for the packet, the 5-tuple consisting of a source Internet Protocol (IP) address, a destination IP address, a source port, a destination port, and a protocol; and
      subsequent to the locating of the multiple dynamic filter rules, determining the specific dynamic filter rule from the multiple dynamic filter rules for the specific client using client identifying information from only the UDP encapsulating source port and not including the 5-tuple produced for the packet; and
   performing IPsec processing of the packet using the located specific dynamic filter rule.

12. The computer program product of claim 11, further comprising:
   receiving an outbound packet for IPsec outbound processing for the specified client;
   determining a 5-tuple for the outbound packet;
   locating a plurality of dynamic security associations (SAs) for the 5-tuple; and
   selecting one of the located dynamic SAs based on a selection of a network address translation (NAT) resolution filter (NRF) that has a 5-tuple matching the 5-tuple for the outbound packet and that is associated with the selected one of the located dynamic SAs.

13. The computer program product of claim 11, further comprising:
   constructing a security policy database comprising a plurality of static filters and dynamic anchor filters;
   pointing each of the dynamic anchor filters to at least one of a dynamic filter and a NAT traversal (NTT) anchor; and
   pointing each of the NTT anchors to one of an NTF dynamic filter and an NAT resolution filter (NRF) entry.

14. The computer program product of claim 11, further comprising:
   building a NAT resolution filter (NRF) entry for an inbound packet; and
   processing an outbound packet, using the NRF entry, to select a security association (SA) among multiple SAs for IPsec processing the outbound packet.

* * * * *